United States Patent
Nothum

(10) Patent No.: US 7,467,706 B2
(45) Date of Patent: Dec. 23, 2008

(54) DEVICE FOR CONVEYING WORKPIECES

(75) Inventor: Stefan Nothum, Nufringen (DE)

(73) Assignee: Eisenmann Anlagenbau GmbH & Co. KG, Boeblingen (DE)

( * ) Notice: Subject to any disclaimer, the term of this patent is extended or adjusted under 35 U.S.C. 154(b) by 0 days.

(21) Appl. No.: 11/607,430

(22) Filed: Dec. 1, 2006

(65) Prior Publication Data

US 2007/0131523 A1 Jun. 14, 2007

(30) Foreign Application Priority Data

Dec. 3, 2005 (DE) .................... 10 2005 057 852

(51) Int. Cl.
B65G 17/34 (2006.01)

(52) U.S. Cl. ............... 198/687.1; 198/465.4; 104/172.1

(58) Field of Classification Search ............. 198/465.1, 198/465.4, 867.14, 867.15, 687.1; 104/172.4, 104/172.5

See application file for complete search history.

(56) References Cited

U.S. PATENT DOCUMENTS

| | | | |
|---|---|---|---|
| 3,572,490 A | | 3/1971 | Babunovic |
| 3,800,937 A | | 4/1974 | Tassie |
| 4,641,583 A | * | 2/1987 | Harrington ............... 104/172.1 |
| 5,819,906 A | * | 10/1998 | Enderlein et al. ........ 198/687.1 |
| 6,382,396 B1 | * | 5/2002 | Dana et al. ............... 198/465.4 |
| 6,588,579 B2 | * | 7/2003 | Taeger .................... 198/687.1 |
| 6,745,892 B2 | * | 6/2004 | Taeger .................... 198/687.1 |

FOREIGN PATENT DOCUMENTS

| | | |
|---|---|---|
| DE | 2231321 | 9/1973 |
| DE | 2952684 C2 | 7/1981 |
| DE | 2840974 C2 | 4/1983 |
| DE | 2432333 C2 | 9/1986 |
| DE | 2916818 C2 | 6/1990 |
| DE | 4138187 C2 | 11/1994 |
| DE | 19803297 A1 | 8/1999 |
| DE | 19830337 C1 | 11/1999 |
| DE | 20209334 U1 | 10/2002 |
| DE | 10135659 A1 | 2/2003 |
| DE | 10249999 B3 | 4/2004 |
| EP | 0122606 B1 | 10/1985 |
| GB | 2053824 A | 7/1979 |

OTHER PUBLICATIONS

German Office Action (3 pages).

* cited by examiner

*Primary Examiner*—James R Bidwell
(74) *Attorney, Agent, or Firm*—Factor & Lake, Ltd.

(57) ABSTRACT

A device for conveying workpieces along a path of movement is described. The device includes a conveyor driven by a conveying drive unit. Spindle or spindle-like elements, on which the workpieces may be arranged, are fastened to the conveyor. The device also includes a synchronizing mechanism with at least one guide device, driven by a synchronizing drive unit, for guiding the spindle or spindle-like elements during movement of the conveyor. The synchronizing drive unit is mechanically coupled with the conveying drive unit to achieve synchronicity.

14 Claims, 4 Drawing Sheets

DEVICE FOR CONVEYING WORKPIECES

RELATED APPLICATIONS

The present invention claims the benefit of the filing date of German Patent Application, Serial No. 10 2005 057 852.7, filed Dec. 3, 2005; the content of which is incorporated by reference herein.

TECHNICAL FIELD

The present invention relates to a device for conveying workpieces along a path of movement, comprising a conveyor, driven by a conveying drive unit, to which spindle or spindle-like elements are fastened on which the workpieces may be arranged, and comprising a synchronising mechanism with at least one guide means, driven by a synchronising drive unit, for guiding the spindle or spindle-like elements during movement of the conveyor.

BACKGROUND OF THE INVENTION

A chain conveyor is known from DE 102 49 999 B3 with spindles for conveying vehicle wheels along a powder-coating station. The synchronising mechanism described in this document comprises two endless belts that each have a straight inner side, which extends parallel to the direction of movement, and an outer side. The endless belts are each guided over two deflection pulleys, of which one in each case is driven. So the position of the spindles is always exactly defined in the conveying direction the two inner sides of the endless belts rest against the spindles in the upper region and fix them. To be able to achieve absolute synchronicity of the endless belts with the chain conveyor, electronic wiring of a drive source of the chain conveyor with a drive source of the endless belts in the manner of master and slave is necessary.

SUMMARY OF THE INVENTION

One aspect of the present invention is directed to a device for use in conveying workpieces, preferably vehicle wheels, along one or more handling station(s), for example in paint-spray lines. The synchronising mechanism holds the spindle or spindle-like elements during their movement. In addition it eliminates any potential play which the spindle or spindle-like elements have on the conveyor, so the position of the workpieces relative to the conveyor cannot change.

An object of the present invention is to configure a device of the type mentioned in the introduction in such a way that synchronicity of the synchronising mechanism with the conveyor is achieved in a technically simple manner, wherein as few electrical and/or electronic components as possible are to be used.

This object is achieved according to the present invention in that the synchronising drive unit is mechanically coupled to the conveying drive unit.

According to the present invention, absolute synchronicity of the guide means with the conveyor is therefore ensured by way of the mechanical coupling of the drive units since synchronicity inevitably takes place. With just one drive source, the two drive units may thus be synchronously driven without electronic wiring being necessary. The degree of electrical complexity is thus reduced. In particular, no actuators, sensors, switch cabinet installations and/or cabling is required—at least for synchronisation of the guide means with the conveyor. No electronic control circuits are required either. The energy requirement of the device is reduced as a result of fewer electronic components being required. Furthermore, the sensitivity of the device—in particular with respect to electromechanical disturbances—is low, so the device as a whole is very reliable and high availability is ensured. Owing to the forced coupling, the synchronicity of the guide means with the conveyor is also independent of speed. The mechanical complexity and the maintenance effort—especially if only one drive source is used—is reduced moreover.

In another aspect of the present invention, the synchronising drive unit is connected by a cardan shaft and/or an intermediate gear to the conveying drive unit. Direct coupling of the synchronising drive unit to the conveying unit is possible by way of the cardan shaft. An intermediate gear moreover allows a change in the speed and/or torques.

In yet another aspect of the present invention, the guide means can comprise at least one pulling or driving member to which—at a spacing from the spindle or spindle-like elements on the pulling or driving member—at least one catch is fastened for the spindle or spindle-like elements. In contrast to the fixing of the spindle or spindle-like elements between two belts known from the prior art, guidance with catches is insensitive to frictional losses caused for example by liquids—in particular by cleaning agents or water—since, in this case, the spindle or spindle-like elements are prevented from the start from slipping through by the catch(es). A catch is thus exactly associated with each spindle or spindle-like element and the spindle or spindle-like elements are carried along synchronously and positionally accurately with respect to the conveyor.

In order to be able to easily adapt the course of the guide means to the path of movement, the pulling or driving member may be a chain or a belt. The course of such pulling or driving members can be flexibly adapted to the path of movement by appropriate deflections.

The pulling or driving member may also be flexible and closed. This has the advantage that—owing to the flexibility of the pulling or driving member—the guide means can be arranged in such a way that it only acts in regions where precise guidance of the spindle or spindle-like elements is required (guide regions). This is the case for example in instances where removal or transfer of the workpieces from or to a robot takes place.

The catches can each comprise at least one guide pin, equipped in particular with rollers, with which they may be guided in a sliding block linkage in a position-controlled manner. Hence, no restoring forces—in particular from the catches—act on the spindle or spindle-like elements since these forces are absorbed by the guide pins in the sliding block linkage. The spindle or spindle-like elements are held more or less free from the catches.

So the position or the orientation of the catches relative to the pulling or driving member may be changed, the catches can each be pivotally fastened by a linking element to the pulling or driving element. This is particularly advantageous, especially in cases where the pulling or driving member with the catches runs along a bend away from the conveyor but the angular orientation of the catches relative to the conveyor should be retained.

The catches may also each comprise a gripping and guiding receiver for the spindle or spindle-like elements with which the spindle or spindle-like elements may be gripped, in particular without a constraining force.

To be able to exactly drive and guide the closed pulling or driving member, the synchronising mechanism may comprise at least two deflecting devices for the pulling or driving member, between which, in particular straight, guide profiles are arranged for the pulling or driving member. The guide profiles ensure that the driving or pulling member, in particular where the catches guide the spindle or spindle-like elements, in the guide region in other words, does not have any play. At least one of the deflecting devices may be driven, so no separate drive means is required for the pulling or driving member.

To prevent the spindle or spindle-like elements from swerving away from the guide means, a, in particular straight, counter guide means for the spindle or spindle-like elements is associated with the guide means at the opposite side of the conveyor that faces away from the guide means.

BRIEF DESCRIPTION OF THE DRAWINGS

Embodiments of the invention are described in more detail hereinafter with the aid of the drawings, in which.

DETAILED DESCRIPTION OF THE PRESENT INVENTION

Figure 1:
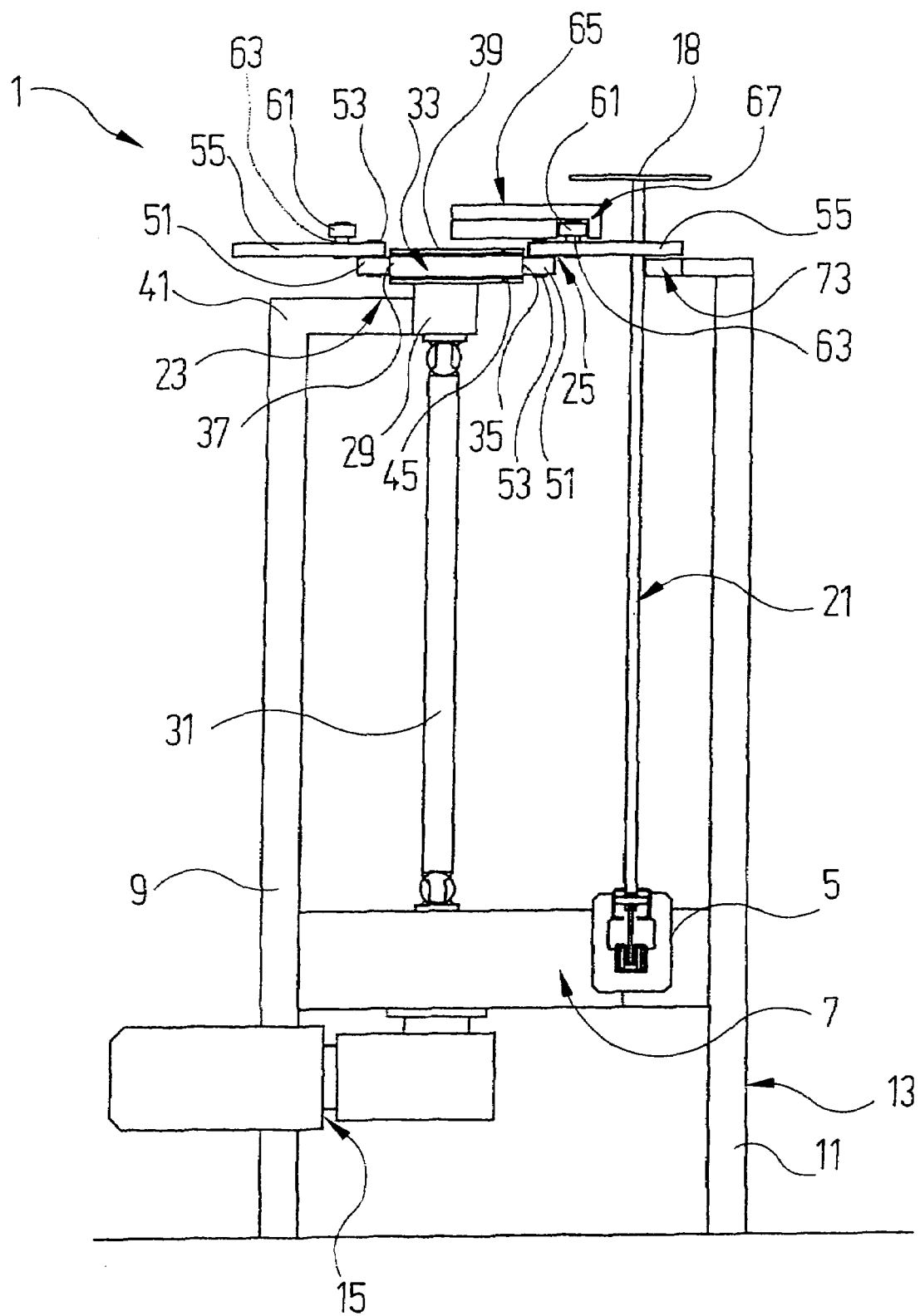
FIG. 1 schematically shows a vertical section of a conveying device for workpieces, comprising a chain conveyor and a synchronising mechanism for spindle or spindle-like elements fastened to the chain conveyor, viewed perpendicularly to the direction of movement of the spindle or spindle-like elements.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 3:
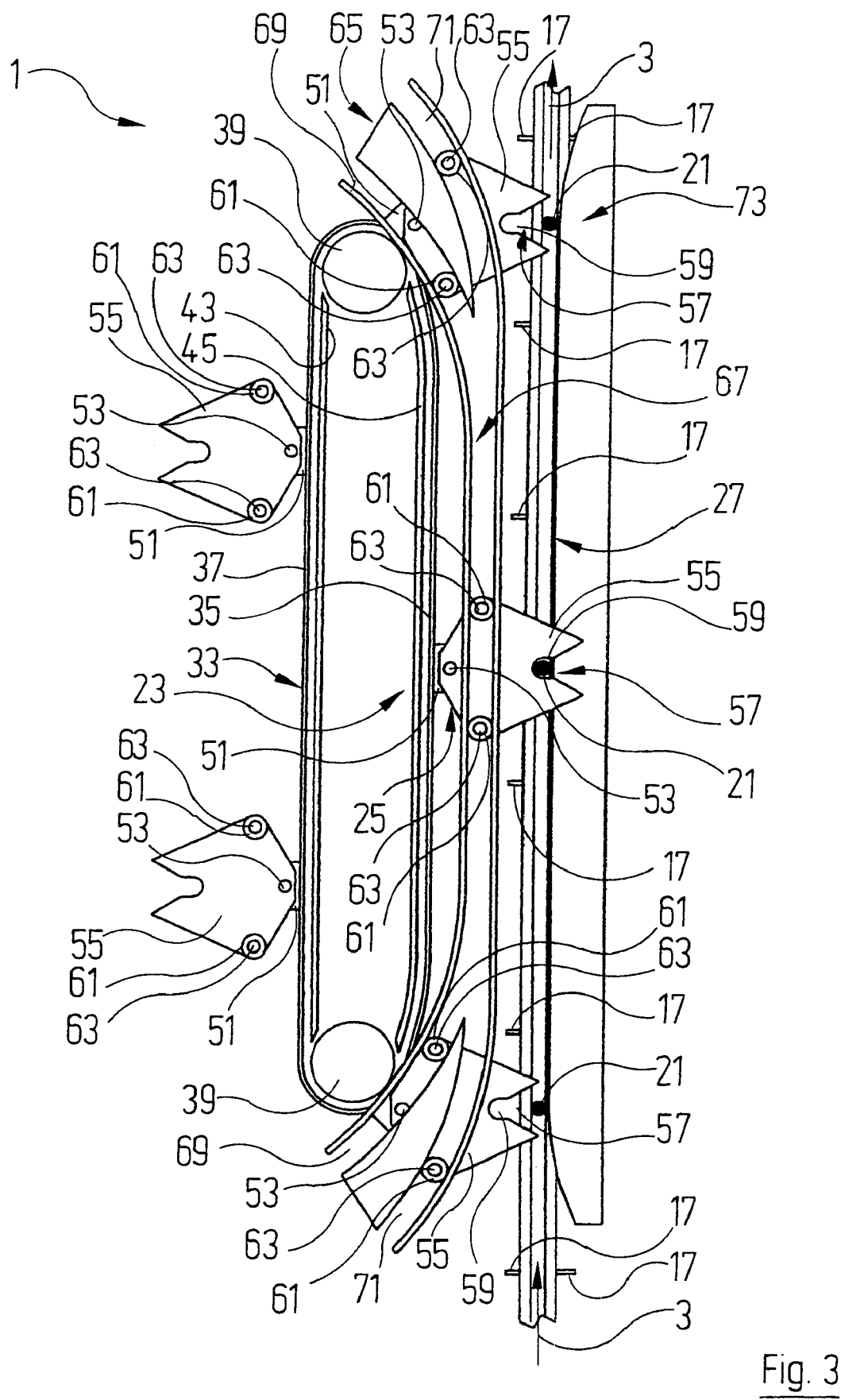
FIG. 3 schematically shows a plan view of the conveying device of FIG. 1.
Figure 4:
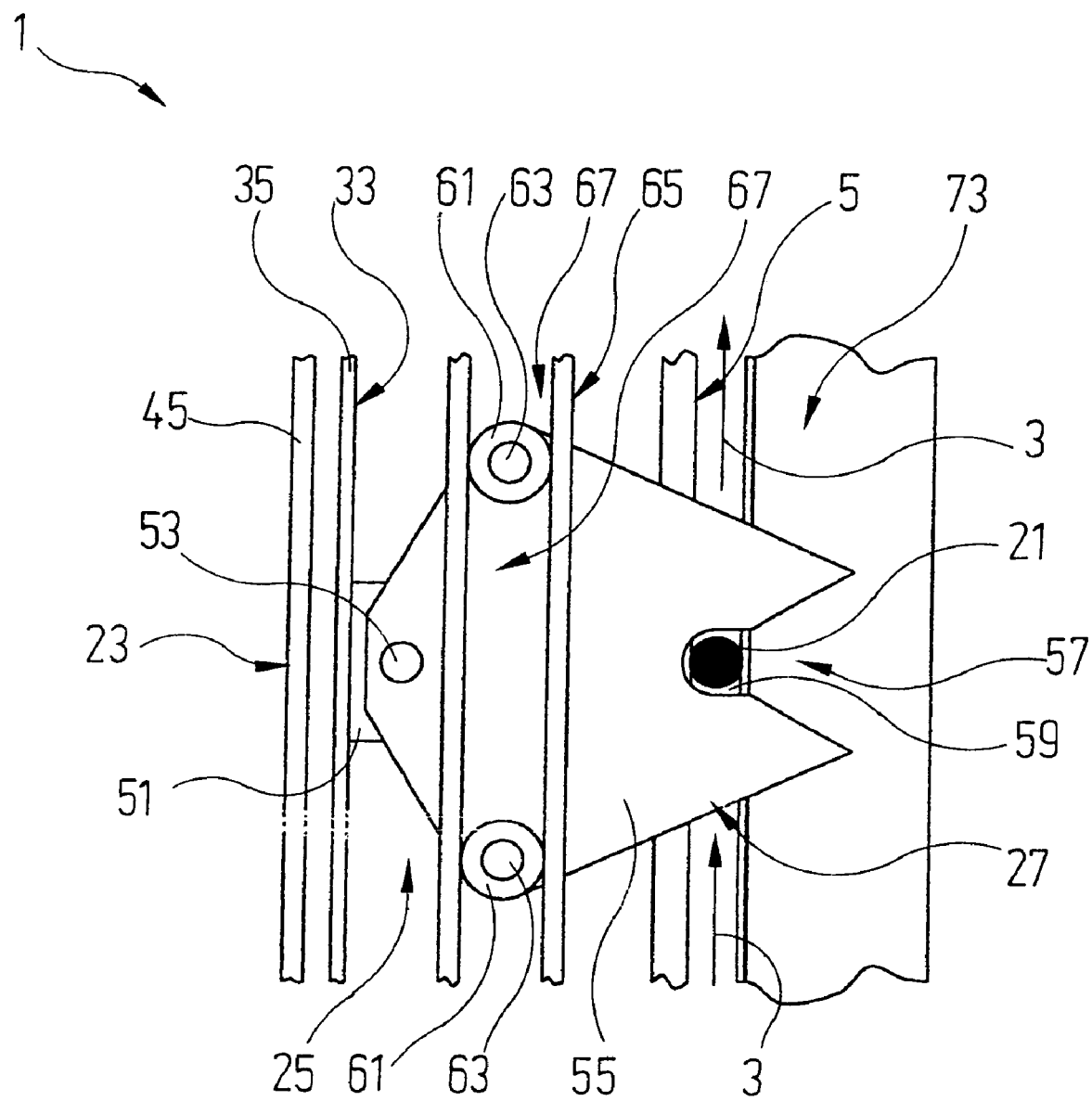
FIG. 4 schematically shows a detailed view of the conveying device of FIG. 3 in the region of a catch of the synchronising mechanism.

FIG. 1 schematically shows a vertical section of a conveying device, provided as a whole with reference numeral 1, for workpieces, not shown, for example vehicle wheels, along a path of movement visible in plan view in FIGS. 3 and 4, indicated by arrow 3.

The conveying device 1 comprises an elongate chain conveyor 5 that at the bottom of FIG. 1, extends substantially horizontally, perpendicular to the drawing plane. The chain conveyor 5 is connected to a conveying drive unit 7 by way of which it may be driven. The conveying drive unit 7 has an approximately cuboidal, horizontally arranged housing and is fastened between a vertical synchronising mechanism support 9, on the left in FIG. 1, and a vertical conveyor support 11, on the right in FIG. 1, of a stand 13 of the conveying device 1. The conveying drive unit 7 is connected to a geared motor 15 which, at the bottom of FIG. 1, is arranged thereon and is also fastened to the synchronising mechanism support 9.

The chain conveyor 5 is arranged on the conveying drive unit 7 in a section that is visible in FIG. 1. It is also provided in further sections on chain conveyor guide elements 17 that are visible in FIG. 3 and which are fastened to further conveyor supports, not shown. The further conveyor supports, which are not shown, with the chain conveyor guide elements 17 are arranged along the path of movement 3 in such a way that the chain conveyor 5 is stably mounted and guided.

In FIG. 1 vertical spindle or spindle-like elements 21 are in each case rotatably fastened to the chain conveyor 5 by their lower end, on the upper plate-like workpiece carriers 18 of which elements the workpieces may be arranged.

Furthermore, the conveying device 1 in FIGS. 1 and 2, slightly below the workpiece carrier 18 of the spindle or spindle-like elements 21, comprises a synchronising mechanism 23 with a guide device 25 for guiding the spindle or spindle-like elements 21 during movement thereof. The synchronising mechanism 23 is oriented in a straight guide region 27, visible in FIG. 3 and 4, parallel to the conveying direction of the chain conveyor 5, along the path of movement 3. It grasps the spindle or spindle-like elements 21 in the guide region 27, in a manner described below, in each case close to their end that faces away from the chain conveyor 5, brings them into a defined, precise position relative to the chain conveyor 5, holds them therein and carries them along synchronously with the chain conveyor 5.

Figure 2:
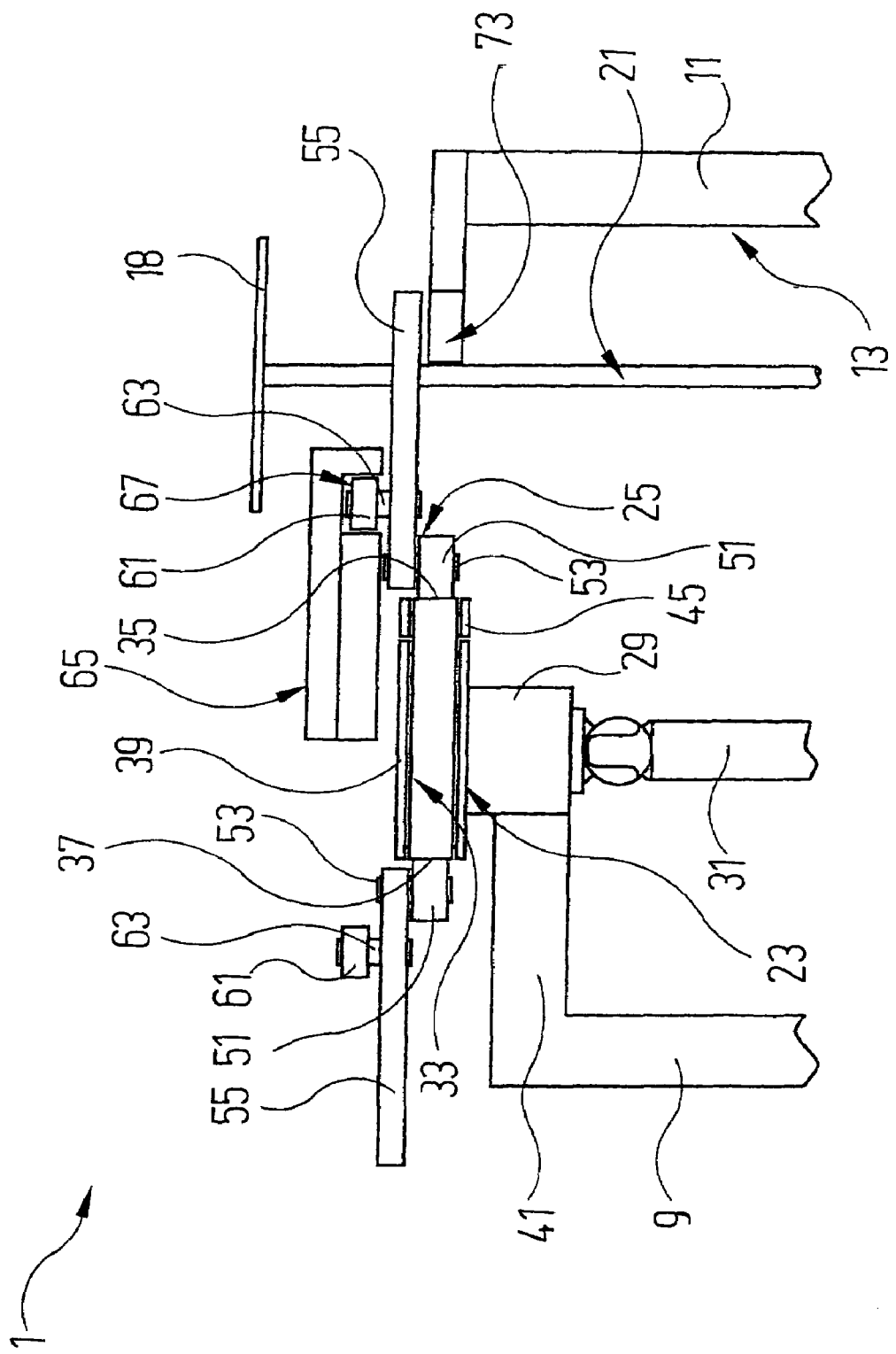
FIG. 2 schematically shows a detailed view of the conveying device of FIG. 1 in the region of the synchronising mechanism.

The guide device 25 is connected to a synchronising drive unit 29 that is visible in FIGS. 1 and 2. The synchronising drive unit 29 is coupled by a vertically extending cardan shaft 31 to the conveying drive unit 7. During operation of the conveying drive unit 7, and therefore the chain conveyor 5, the synchronising drive unit 29, and thus the guide device 25, is synchronously co-driven via the cardan shaft 31.

The guide device 25 comprises a short, closed guide belt 33 in the form of an endless belt. The guide belt 33 has a straight side 35 extending parallel to the path of movement 3 along the guide region 27, and which faces the chain conveyor 5, and a side 37 which faces away from the chain conveyor 5. The guide belt 33 is guided over two deflection pulleys 39, of which the one visible in FIG. 1, or upper one in FIG. 3, is connected to the synchronising drive unit 29 so as to be drivable. The deflection pulleys 39 and the synchronising drive unit 29 are fastened by way or transverse struts 41, of which only the one associated with the upper deflection pulley 39 in FIG. 3 is visible in FIGS. 1 and 2, to the upper ends of the respective synchronising mechanism support 9.

The sides 35 and 37 are each guided along a substantially straight, rigid guide profile 43 or 45 that extends parallel to the path of movement 3, and are supported thereby. Only guide profile 43 is visible in FIG. 3. The guide profiles 43 and 45 are located in the space surrounded by the guide belt 33, in each case on the inner face of the side 35 and 37 that faces the other side 37 or 35. They are fastened to the stand 13 by fastening means (not shown).

The guide profile 43 that faces away from the chain conveyor 5, as may be seen in FIG. 3, in its extension runs tangentially to the two deflection pulleys 39, so it has a stabilising effect for the remote side 37.

The guide profile 45 that faces the chain conveyor 5 is parallel and offset in the direction of the chain conveyor 5 from the inner region delimited by the common tangents at this location to the two deflection rollers 39. The two ends of the guide profile 45 are bent toward the respective deflection pulleys 39, so the guide profile 45 comes to a stop here in each case tangentially to the deflection pulley 39. The course of the side 35 facing the chain conveyor 5 is thus gently adapted to the curvature of the deflection pulleys 39.

At the outer side of the guide belt 33, at a spacing from the spindle or spindle-like elements 21, there is arranged a large number of cuboidal linking elements 51. A catch 55 for one of the spindle or spindle-like elements 21 is pivotally fastened to each linking element 51 by way of a catch link 53.

The catches 55 are flat plates which substantially have the shape of an isosceles kite, and this may be seen in FIG. 3 and 4. One apex of which kite, adjacent to the catch link 53, is capped however. The opposing, outwardly pointing apex is notched in the shape of a V. The axes of symmetry of the kites, if the catch 55 is located within the guide region 27, are in each case situated perpendicularly on the outer face of the guide belt 33. Their planes extend parallel to the plane spanned by the endless guide belt 33.

The V-shaped notches of the catches 55 are used as gripping and guiding receivers 57 for the spindle or spindle-like element 21. The apexes of the V's point toward the guide belt 33. They merge into an approximately semicircular depression 59 in each case. The diameter of the semicircular depressions 59 is slightly greater than the external diameter of the spindle or spindle-like elements 21, so the spindle or spindle-like elements 21 can be introduced at this location and held.

Each catch 55 comprises two guide pins 63 equipped with a roller 61 in each case. At the side of the catch 55 facing away from the link element 51 the guide pins 63 project, symmetrically to the axis of symmetry thereof of the catch 55, perpendicularly, upwards in FIG. 1. The catches 55 may be guided in a position-controlled manner in a sliding block linkage 65 by the guide pins 63.

The sliding block linkage 65 is located, viewed from the side, as in FIG. 1, above the catches 55, viewed from above, as in FIG. 3, between the guide belt 33 and the chain conveyor 5. It is fastened to the stand 13 by fastening means (not shown). The sliding block linkage 65 is substantially a rail with a guide groove 67 that is open toward the catches 55 and extends substantially parallel to the path of movement 3. In the regions of the deflection pulley 39 the guide groove 67 is split, in each case at an acute angle, into a guide groove region 71 that faces the chain conveyor 5 and a guide groove region 69 that faces away from the chain conveyor 5, as may be seen in FIG. 3. Upstream or downstream of the guide region 27 the two guide groove regions 69 and 71 comprise a respective bend toward the respective deflection pulley 39, wherein the guide groove region 69 that faces away from the chain conveyor 5 extends almost tangentially to the respective deflection pulley 39, and the guide groove region 71 that faces the chain conveyor 5 extends at a greater spacing with a greater radius of curvature than the guide groove region 69 that faces away from the chain conveyor 5.

Using the guide pins 63 and the rollers 62, mounted thereon, of the sliding block linkage 65 the catches 55 can be brought into engagement with the spindle or spindle-like elements 21. For this purpose the shape and position of the bends and the spacings of the guide groove regions 69 and 71 between each other and the guide belt 33 are adapted to the dimensions and pivot points of the catch links 53 and the positions of the guide pins 63 and rollers 61 in such a way that when the guide belt 33 advances the guide pin 63 of the catch 55 that is leading in the direction of the path of movement 3 is guided into the guide groove region 71 that faces the chain conveyor 5 and the trailing guide pin 63 is guided into the guide groove region 69 that faces away from the chain conveyor 5 in such a way that the catch 55 does not change its angle of orientation relative to the chain conveyor 5, at least until the respective spindle or spindle-like element 21 outside of the guide region 27 is no longer situated in the region of the gripping and guiding receiver 57. The catch 55 thus executes a translatory movement parallel to the path of movement 3 synchronously with the spindle or spindle-like element 21 and at the same time a superimposed translatory movement perpendicular to the path of movement 3 and away from it. The gripping and guiding receiver 57 may thus be pulled almost without force or friction from the spindle or spindle-like element 21. The kite shape of the catches 55 allows the catches, in the region of the deflection pulleys 39, to be pivoted very closely toward the guide belt 33 in this connection. It is thus possible to pivot the catches 55 in the reversal point of the guide belt 33 to the extent that their axes of symmetry extend almost tangentially to the respective deflection pulley 39 and perpendicular to the path of movement 3.

The gripping and guiding receiver 57 is pushed onto the corresponding spindle or spindle-like elements 21 as the catch 55 enters the guide region 27, at the bottom in FIG. 3, analogously in reverse. In this connection the guide pin 63, which is leading in the direction of the path of movement 3, with the roller 61 is situated in the guide groove region 69 that faces away from the chain conveyor 5 and the trailing guide pin 63 with the associated roller 61 is situated in the guide groove region 71 that faces the chain conveyor 5. The spindle or spindle-like elements 21 are grasped without constraining force by the corresponding catches 55 and are co-guided synchronously and in a positionally accurate manner with respect to the chain conveyor 5 as far as the above-described division following the guide region 27 at the level of the upper deflection pulley 39 in FIG. 3.

The V shape of the gripping and guiding receiver 57 assists the force-free, almost contact-less receipt and delivery of the corresponding spindle or spindle-like elements 21.

A cuboidal counter guide device 73, elongated in the direction of the guide region 27 and below the catches 55, approximately at the same level as the guide belt 33, for the spindle or spindle-like elements 21 is associated with the guide device 25 at the opposite side, remote from the guide device, of the chain conveyor 5, as viewed from the side in FIG. 1. The side thereof that faces the chain conveyor 5 extends parallel to the path of movement 3, so the spindle or spindle-like elements 21 slide along the counter guide device 73 almost free of force and friction as they pass through the guide region 27. On either side the counter guide device 73 projects slightly beyond the guide region 27 delimited approximately by the deflection pulleys 39. This may be seen in FIG. 3. Their surface facing the guide belt 33 is bent away from the guide belt 33 at both ends, so the entrance and exit of the spindle or spindle-like elements 21 into/from the guide region 27 is facilitated.

The counter guide device 73 is fastened to the upper ends of the conveying supports 11.

A different type of conveyor may be used instead of the chain conveyor 5.

Instead of or in addition to the cardan shaft 31 the synchronising drive unit 29 may also be mechanically coupled to the conveying drive unit 7 in a different manner, for example by an intermediate gear. The synchronising drive unit 29 and the conveying drive unit 7 may also be arranged side by side, in particular at the same level. They may also be integrated in a common housing and/or as a single combined drive unit.

Instead of the guide belt 33 a different flexible pulling or driving member, in particular a chain, a band or a belt, may be provided. A plurality of pulling or driving members may also be used. The pulling or driving member may also be open instead of closed.

Instead of two guide pins 63 each catch 55 may also comprise just one or more than two guide pin(s) 63. The guide pins 63 may also be constructed without rollers 61.

The synchronising mechanism 23 may also comprise more than two deflecting devices with which the guide device 25 may be divided into differently oriented guide regions that are adapted to the course of the path of movement 3.

It is to be understood that the present invention may be embodied in other specific forms without departing from the spirit or central characteristics thereof. The present embodiments, therefore, are to be considered in all respects as illustrative and not restrictive, and the present invention is not to be limited to the details provided herein. While specific embodiments have been illustrated and described, numerous modification come to mind without significantly departing form the characteristics of the present invention and the scope of protection is only limited by the scope of the accompanying claims.

The invention claimed is:

1. A device for conveying workpieces along a path of movement, comprising a conveyor, driven by a conveying drive unit, to which spindle elements are fastened on which the workpieces may be arranged, and further comprising a synchronising mechanism with at least one guide means, driven by a synchronising drive unit, for guiding the spindle elements during movement of the conveyor wherein the synchronising drive unit is mechanically coupled to the conveying drive unit by a cardan shaft and/or an intermediate gear to the conveying drive unit.

2. The device according to claim 1, wherein the at least one guide means comprises at least one pulling or driving member to which, at a spacing from the spindle elements on the pulling or driving member, at least one catch is fastened for the spindle elements.

3. The device according to claim 2, wherein the pulling or driving member is a chain or a belt.

4. The device according to claim 3, wherein the pulling or driving member is flexible and closed.

5. The device according to claim 2, wherein the at least one catch each comprises at least one guide pin, equipped in particular with rollers, with which pins they may be guided in a sliding block linkage in a position-controlled manner.

6. The device according to claim 2, wherein the at least one catch is each pivotally fastened by a linking element to the pulling or driving element.

7. The device according to claim 2, wherein the at least one catch each comprises a gripping and guiding receiver for the spindle elements.

8. The device according to claim 1, wherein the synchronising mechanism comprises at least one deflecting device for the pulling or driving member, between which, at least one guide profile is arranged for the pulling or driving member, wherein at least one of the deflecting devices may be driven.

9. The device according to claim 8, wherein the at least one guide profile is straight.

10. The device according to claim 1, wherein a counter guide means for the spindle elements is associated with the at least one guide means at the opposite side of the conveyor that faces away from the at least one guide means.

11. The device according to claim 10, wherein the counter guide means is straight.

12. A device for conveying workpieces along a path of movement, comprising a conveyor, driven by a conveying drive unit, to which spindle elements are fastened on which the workpieces may be arranged, and further comprising a synchronising mechanism with at least one guide means comprising at least one pulling or driving member to which, at a spacing from the spindle elements on the pulling or driving member, at least one catch comprising at least one guide pin equipped in particular with rollers with which pins they may be guided in a sliding block linkage in a position-controlled manner, is fastened for the spindle elements, driven by a synchronising drive unit, for guiding the spindle elements during movement of the conveyor wherein the synchronising drive unit is mechanically coupled to the conveying drive unit.

13. A device for conveying workpieces along a path of movement, comprising a conveyor, driven by a conveying drive unit, to which spindle elements are fastened on which the workpieces may be arranged, and further comprising a synchronising mechanism with at least one guide means, driven by a synchronising drive unit, for guiding the spindle elements during movement of the conveyor wherein the synchronising drive unit is mechanically coupled to the conveying drive unit, wherein the synchronising mechanism comprises at least one deflecting device for the pulling or driving member, between which, at least one guide profile is arranged for the pulling or driving member, wherein at least one of the deflecting devices may be driven.

14. The device according to claim 13, wherein the at least one guide profile is straight.

* * * * *